(12) United States Patent
Sabnis et al.

(10) Patent No.: US 12,526,893 B2
(45) Date of Patent: Jan. 13, 2026

(54) EMERGENCY LIGHTING SYSTEM

(71) Applicant: SIGNIFY HOLDING B.V., Eindhoven (NL)

(72) Inventors: Abhishek Chandrashekar Sabnis, Collierville, TN (US); Tawatos Phadungsoondararak, Memphis, TN (US)

(73) Assignee: SIGNIFY HOLDING B.V., Eindhoven (NL)

( * ) Notice: Subject to any disclaimer, the term of this patent is extended or adjusted under 35 U.S.C. 154(b) by 161 days.

(21) Appl. No.: 18/280,108

(22) PCT Filed: Mar. 1, 2022

(86) PCT No.: PCT/EP2022/055160
§ 371 (c)(1),
(2) Date: Sep. 1, 2023

(87) PCT Pub. No.: WO2022/184718
PCT Pub. Date: Sep. 9, 2022

(65) Prior Publication Data
US 2024/0049374 A1   Feb. 8, 2024

Related U.S. Application Data

(60) Provisional application No. 63/155,856, filed on Mar. 3, 2021.

(30) Foreign Application Priority Data

Mar. 12, 2021  (EP) .................................. 21162223

(51) Int. Cl.
*H05B 45/10* (2020.01)
*H05B 45/14* (2020.01)
(Continued)

(52) U.S. Cl.
CPC ............ *H05B 45/50* (2020.01); *H05B 45/14* (2020.01); *H05B 45/325* (2020.01)

(58) Field of Classification Search
CPC ........ H05B 45/10; H05B 45/14; H05B 45/20; H05B 45/24; H05B 45/30; H05B 45/31;
(Continued)

(56) References Cited

U.S. PATENT DOCUMENTS 9,155,162 B2 * 10/2015 Zotter ................... H05B 47/16
2014/0077718 A1 * 3/2014 Zotter ................... H05B 39/08
                                                                315/246
(Continued)

FOREIGN PATENT DOCUMENTS

EP          3599798 A1     1/2020

*Primary Examiner* — Long Nguyen

(57) ABSTRACT

An emergency power system (100) and emergency lighting dimming method are disclosed. The emergency power system (100) includes a power source (10), a phase-cut waveform generator (11, 13, 300, 310, 311, 400, 410, 411) coupled to the output of the power source (10) and arranged to provide a phase-cut waveform (FIGS. 2 and 3) to a load (12). The load may be one or more emergency lighting devices. A feedback detection module (14, 201) may be is used to monitor the voltage and/or current data supplied to the load (12) by the phase-cut waveform generator. A controller (13, 202-205) controls the phase-cur waveform generator (11, 13, 300, 310, 311, 400, 410, 411) to adjust the power level of the load (12) by modifying the phase-cur waveform based upon the monitored voltage and/or current data and reference data to achieve the appropriate dimming level.

10 Claims, 5 Drawing Sheets

(51) Int. Cl.
*H05B 45/325* (2020.01)
*H05B 45/50* (2022.01)

(58) Field of Classification Search
CPC .... H05B 45/315; H05B 45/32; H05B 45/325; H05B 45/50; H05B 47/10; H05B 47/105; H05B 47/11; H05B 47/16; H05B 47/20; H05B 47/29; F21S 9/02; F21S 9/022; F21S 9/024
See application file for complete search history.

(56) References Cited

U.S. PATENT DOCUMENTS

2017/0033598 A1    2/2017   Shen et al.
2020/0340635 A1   10/2020   Boulanger et al.

* cited by examiner

10 — emergency power source
11 — H-bridge
12 — load
13 — controller
14 — detection module
15 — interface

```
300 - sine wave generator
310 - filter
311 - switching device
400 - sine wave generator
410 - filter
411 - switching device
```

201 – current sensors
202 – feedback module
203 – controller
204 – memory
205 – PWM signal module

EMERGENCY LIGHTING SYSTEM

CROSS-REFERENCE TO PRIOR APPLICATIONS

This application is the U.S. National Phase application under 35 U.S.C. § 371 of International Application No. PCT/EP2022/055160, filed on Mar. 1, 2022, which claims the benefit of European Patent Application No. 21162223.8, filed on Mar. 12, 2021, and U.S. Provisional Application No. 63/155,856, filed Mar. 3, 2021. These applications are hereby incorporated by reference herein.

FIELD OF THE INVENTION

The invention relates to systems and methods for providing emergency lighting more particularly, to an emergency lighting system including a phase-cut waveform generator which may use a dimming unit to control lighting devices using power load feedback from the lighting devices.

BACKGROUND

When a power failure/outage occurs, there is a need for emergency backup power systems to provide temporary emergency lighting. Conventional backup power systems may include uninterruptible power supplies (or UPS) to provide emergency power to a load when an input power source, e.g., mains power, fails. The on-battery runtime of the UPS is limited so efficient use of the emergency power is important. It is noted that inverter battery backup systems are also commonly used in emergency lighting systems.

Emergency lighting refers to lighting that is activated upon power failure. An objective of emergency lighting is to allow occupants in a building to leave the building safely upon power failure or in other emergency situations. Within a building, the emergency lighting is usually provided by an emergency lighting device (e.g., LED or fluorescent lamp) powered by the emergency backup power system. A battery pack may also be provided in the emergency lighting device.

Conventional emergency backup inverter systems are known to provide power at dimmed level to operate a normal lamp driver along with a dimming signal. The dimming signal is a separate dimmer input provided to a lamp driver to reduce the light level. Conventional types of dimmer signals include 0-10V and DALI. With a 1-10 V dimming technique, a signal is transmitted between 1 V and 10 V. 10 V is the maximum amount (100%) and 1 V is the minimum amount (the exact percentages of dimming may vary). The light output of the luminaire is scaled such that a voltage of 10 V provides 100% light output and, 0 V provides the least light output. With a DALI (Digital Addressable Lighting Interface) dimming technique, each system consists of a controller and a maximum of 64 lighting components, such as a ballast. Each of these lighting components is given a unique address. The controller can control these lighting components because the DALI system can transmit and receive dimming signals.

A system to dim output power using a dimming signal is described in US 2017/0033598 A1 incorporated herein by reference.

Conventional lighting devices such as DoB LED, screw base LED, CFL and (not limited to) direct AC input TLED are common in the lighting market. The DoB (driver-on-board) LED include on-board modules may be used as the LED light source. The DoB LED modules use solid states electronics. Screw base LED and CFLs are LED or compact fluorescent lamps designed to replace incandescent light bulbs and fit into light fixtures designed for incandescent bulbs. Tubular LED lamps (TLED) are designed to retrofit existing fluorescent lamp fixtures with LED lighting. Some TLED retrofit lamps have internal drivers that can accept AC input through the original fluorescent ballast or through connection to line voltage. Some of these retrofit LED lamps are dimmable but they do not have separate dimming signal inputs unless they are a "smart LED".

To provide dimming capability to lighting devices that do not include a separate dimming signal input another conventional method may be used if the lighting device is compatible with this type of dimming. In this method, the emergency inverter includes a programmable control unit for reducing the power supplied to a lighting device in an emergency state. When the emergency inverter is initially activated, a power level must be determined based on (1) the rated output power of the emergency inverter, (2) the number of lighting device drivers connected to the emergency inverter, and (3) characteristics of the lighting device drivers. The programmable control unit preset by a user to the determined power level to ensure that the total power usage by the emergency lighting devices is kept within the rated power of the emergency inverter/power source. While this method does not require a separate dimming signal input, the preset nature of the programmable control unit by the user is inconvenient. Also, if the power load requirements change, for example, if the features or number of emergency lighting devices change, the preset power level in the programmable control unit must be recalculated and reset which increases workload and time costs.

There are two main problems shortcoming with the conventional emergency lighting systems discussed above. First, if the emergency lighting devices do not include a separate dimming signal input then the 0-10V or DALI dimming control signals cannot be used to dim the emergency lighting devices to conserve power from the emergency inverter/power source. Second, even if the emergency inverter is equipped with a programmable control unit with a preset power level, any change to the emergency lighting system will incur additional workload and time by the user.

This document describes systems and methods that are intended to address at least some issues discussed above and/or other issues as discussed below.

SUMMARY OF THE INVENTION

Aspects and embodiments of the present invention address one and/or both of the shortcomings noted above.

One aspect of the present invention is related to an improved method using an emergency lighting driver/inverter with dimming capability using a phase-cut dimming scheme.

Other aspects of the present invention utilize different approaches to create a wave output with phase cut waveform which include creating a phase-cut waveform from a wave and a creating phase-cut waveform from SPWM. The wave may be, for example, a sine, a rectangular or a triangular wave.

One embodiment of the present invention is directed to an emergency power system including a power source and a phase-cut waveform generator coupled to the output of the power source and arranged to provide a phase-cut waveform to a load. The load may be one or more emergency lighting devices. A detection module is used to monitor the voltage and/or current supplied to the load by the phase-cut waveform generator. A controller controls the phase-cut waveform generator to adjust/reduce the power level of the load by modifying the phase-cut waveform based upon the monitored voltage and/or current data and reference data.

Another embodiment of the present invention is directed to a method for dimming an emergency lighting device. The method includes the steps of measuring a load voltage and current of an emergency lighting device, comparing reference dimming data with the measured load voltage and current and determining a dimming control signal based upon the comparison. The method also includes the step of generating a phase-cut waveform based upon the control signal to reduce the load voltage and current of the emergency lighting device. The phase-cut waveform may be generated from SPWM.

Yet another embodiment of the present invention is directed to an emergency power system a power source and a phase-cut waveform generator including a wave generator coupled to the output of the power source and arranged to provide a phase-cut waveform to a load. The phase-cut waveform generator is configured with a preset power level, which is not user-controllable or settable, to provide to the load.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows elements of an emergency lighting system according to one embodiment of the present invention.

DETAILED DESCRIPTION OF PREFERRED EMBODIMENTS

Figure 9:
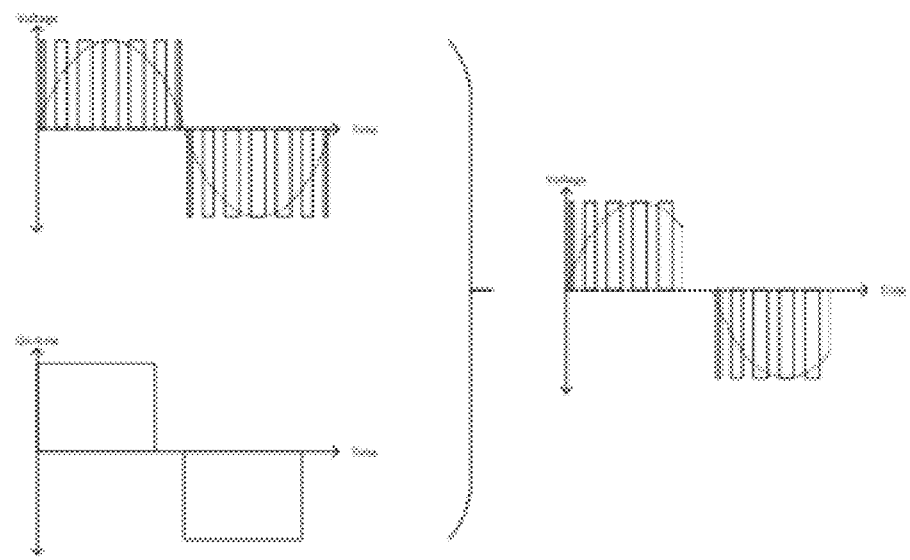
FIG. 9 shows a trailing-edge phase-cut waveform created from SPWM, FIG. 10 schematically shows an embodiment of a dimmer controller according to another embodiment of the present invention.

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

As used herein for purposes of the present disclosure, the term "load" refers to an electronic device drawing current from a power source. Examples of a load may include a lighting device, such as resistive incandescent, halogen, compact fluorescent lights light-emitting diodes (LEDs), and lamp drivers.

The term "dimming" refers to lowering the power applied to a load, such as lowering the brightness of a light by changing/chopping the voltage waveform or reducing the current of an AC source applied to a load, or lowering the voltage of a DC power source applied to the lighting.

The term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture or device" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The terms "controller" or "module" are used herein generally to describe a structure or circuitry that can be implemented in numerous ways (e.g., such as with dedicated hardware and/or software) to perform various functions discussed herein. A "processor" is one example of a controller (or a central component of a controller) which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

Further, the invention is not limited to the embodiments, and the invention lies in each and every novel feature or combination of features described herein or recited in mutually different dependent claims.

Figure 1:
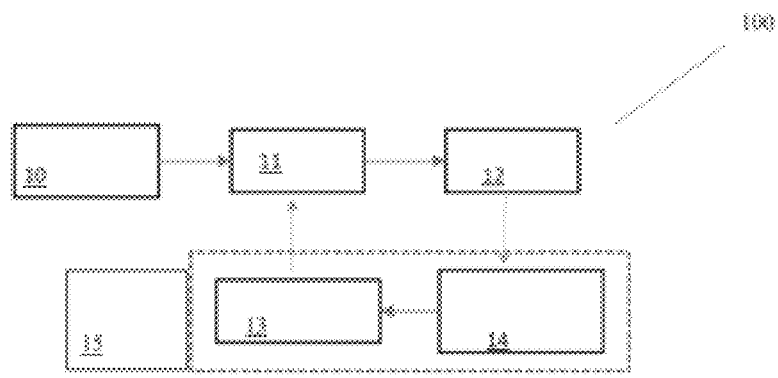

FIG. 1 shows an example of emergency lighting system (ELS) 100 according to one embodiment. The ELS 100 includes an emergency power source 10. The emergency power source 10 may be configured using various components such as an uninterruptible power supply (UPS) (not shown). The UPS maybe connected to an active input AC power source (not shown). Other options for the emergency power source 10 include an engine-powered generator or an inverter and battery system. The output emergency power source 10 is connected to an H-bridge 11. The H-bridge 11 includes switches (not shown) that control the power to a load 12. In this embodiment, the load 12 is one or more emergency lighting fixtures such as LED-based lighting units. The H-Bridge 11 receives Pulse Width Modulation (PWM) signals from a controller 13 to adjust the power provided to the load 12. A feedback loop may be created using a detection module 14. The detection module 14 monitors the power provided to the load 12 so that adjustments to the power provided to the load 12 can be made by the controller 13.

Figure 2:
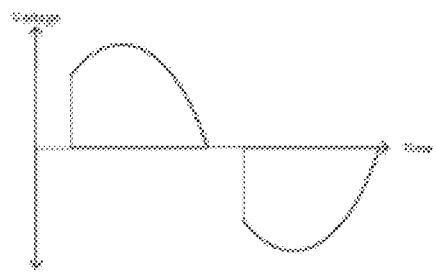
FIG. 2 shows a leading-edge phase-cut waveform.
Figure 3:
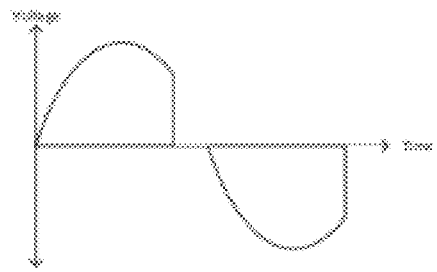
FIG. 3 shows a trailing-edge phase-cut waveform.

Various embodiments related to the control/adjustment of the power provided to the load 12 will now be discussed in reference to FIGS. 2-9. One aspect of the present invention is to create a sine wave output with phase cut waveform. Of course, it should be understood that other types of waves may be used, e.g., a rectangular or a triangular wave. The waveform can be either leading-edge as shown in FIG. 2 or trailing edge as shown in FIG. 3. The sine wave output with phase cut waveform alters the output power by altering supply voltage. Reducing the output power supplied to the load 12 creates the dimming in the emergency lighting fixtures. In the illustrated embodiments, the chopping of the sine wave achieves the dimming of the AC outputs to the load 12 so that necessary illumination time periods and outputs required for safe egress during an emergency backup and loss of AC power condition can be maintained.

In the various embodiments of the present invention, different approaches may be used to create the sine wave output with phase cut waveform which include creating phase-cut waveform from a sine wave and creating phase-cut waveform from SPWM.

As one of ordinary skill will understand, the term SPWM stands for "Sinusoidal pulse width modulation" and is a technique of pulse width modulation used in inverters. An inverter generates an output of AC voltage from an input of DC with the help of switching circuits to reproduce a sine wave by generating one or more square pulses of voltage per half cycle. If the size of the pulses is adjusted, the output is said to be pulse width modulated. With this modulation, some pulses are produced per half cycle. The pulses close to the ends of the half cycle are constantly narrower than the pulses close to the center of the half cycle such that the pulse widths are comparative to the equivalent amplitude of a sine wave at that part of the cycle. To change the efficient output voltage, the widths of all pulses are amplified or reduced while keeping the sinusoidal proportionality. With PWM (pulse width modulation), only the on-time of the pulses are changed during the amplitudes.

The conventional hardware and software requirements of SPWM may include Microcontroller, MOSFET, Gate Driver, Crystal Oscillator, Toggle Switches, Resistors, Capacitors, Required Diodes, Transformer, Regulator, Opto-isolators, Keil compiler, and Languages: Assembly or a high level language such as Embedded C, Python or Ruby.

Figure 4:
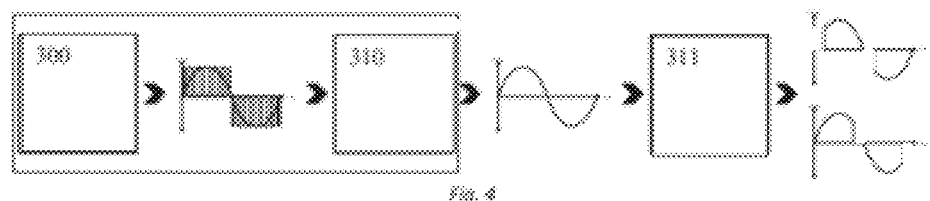
FIG. 4 shows a block diagram for creating a phase-cut waveform from sine wave.
Figure 6:
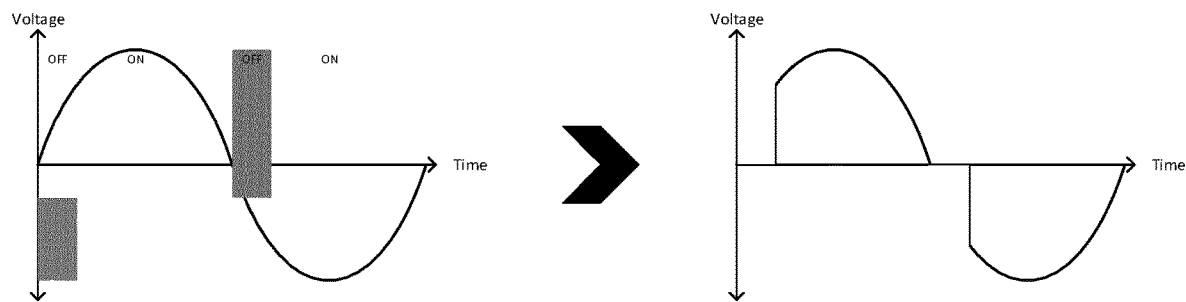
FIG. 6 shows a leading-edge phase-cut waveform created from a sine wave.
Figure 7:
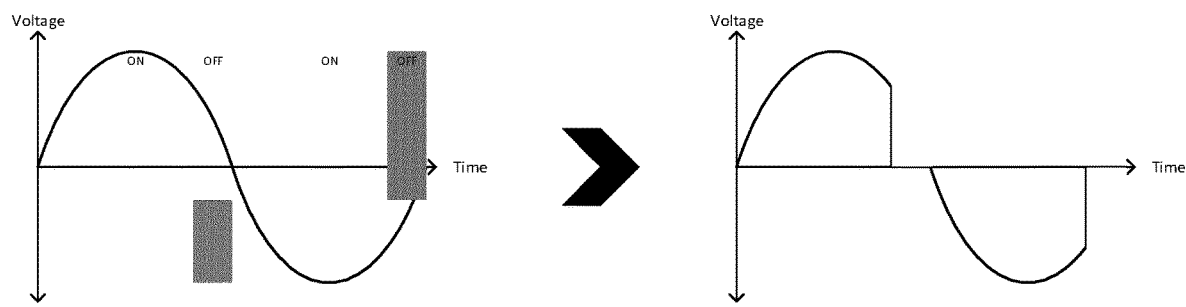
FIG. 7 shows a trailing-edge phase-cut waveform created from a sine wave.

FIG. 4 shows a first approach is to generate a complete sine wave using a sine wave generator 300 and a filter 310 then using a switching device 311 to switch on and off to form phase-cut waveform from the complete sine wave. To generate the complete sine wave a sine wave generator which may be a SPWM H-Bridge is used. It will be understood by those of ordinary skill that other ways of generating sine wave may be used with a switching device to form the sine wave into phase-cut waveform. FIG. 6 and FIG. 7 show how the switching device 211 (such as SCR, MOSFET, TRIAC or other semiconductor devices) creates two types of the waveforms.

Figure 5:
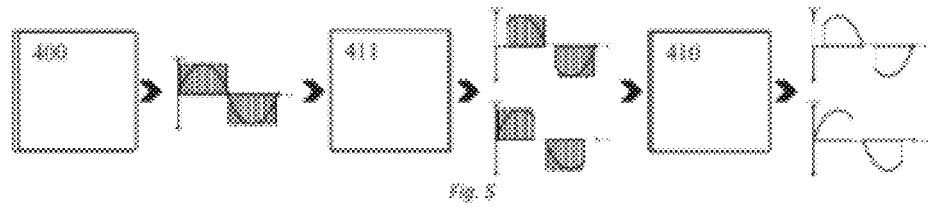
FIG. 5 shows a block diagram for creating a phase-cut waveform from SPWM.
Figure 8:
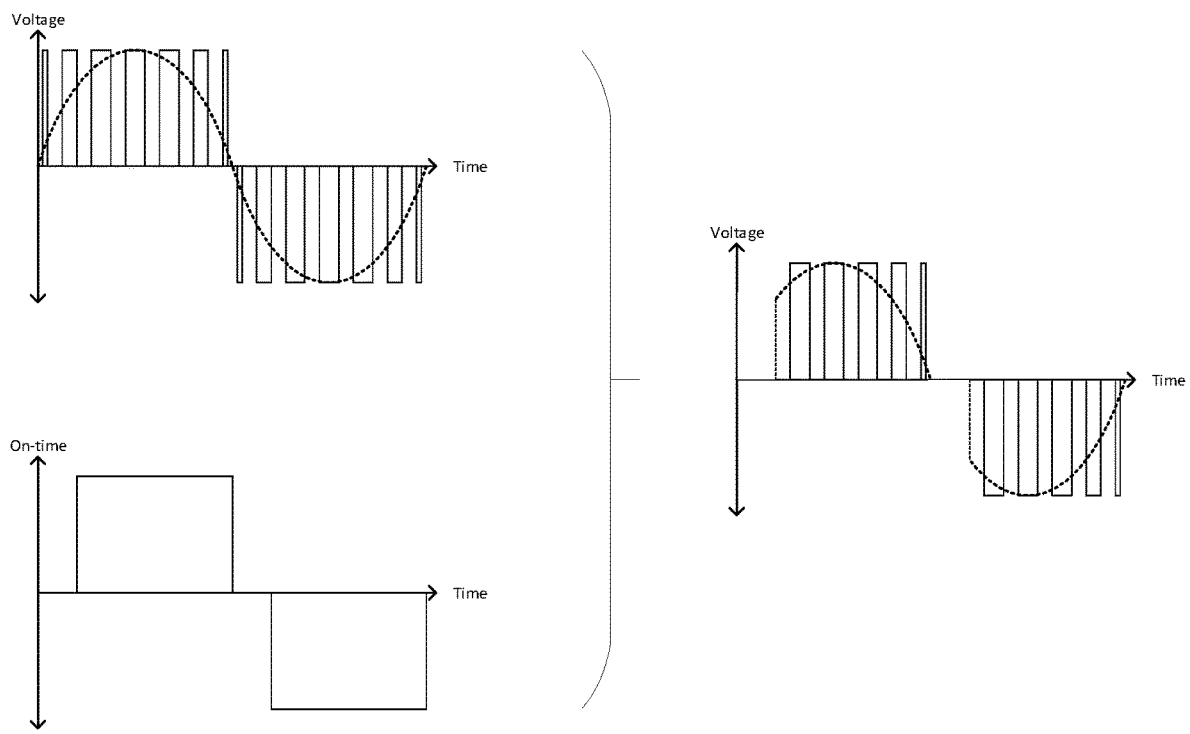
FIG. 8 shows a leading-edge phase-cut waveform created from SPWM.

The second approach uses an algorithm (which may be implemented in software or hardware by the SPWM) to create phase-cut waveform in one step. This is done by modulating on-time step function to the SPWM signal and create PWM signal that corresponds to the phase-cut waveform then filter the PWM to get phase-cut waveform. As shown in FIG. 5, a sine wave generator 400, a switching device 411 and a filter 410 may be used. FIG. 8 and FIG. 9 show how to create the phase-cut waveform by modulating SPWM and on-time step function together.

Referring back to FIG. 1, in some embodiments the H-Bridge 11 and the controller 13 may be used to implement the first and the second approaches discussed above.

Figure 10:
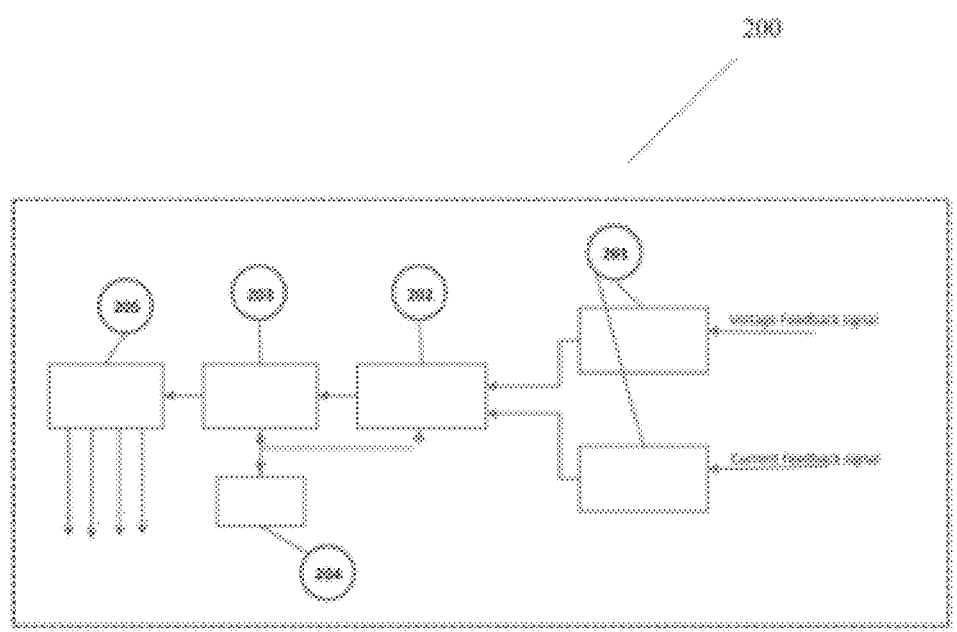

FIG. 10 shows a block diagram a dimmer controller 200 according one embodiment of the present invention. The components of the dimmer controller 200 may include or replace the controller 13 and the detection module 14 as shown in FIG. 1. As shown in FIG. 10, voltage and/or current sensors 201 are used to monitor one or both of the load 12 voltage and the load 12 current. The voltage and/or current sensors 201 may be implemented using various conventional discreet or integrated circuit components. The monitored voltage/current data is used by a feedback module 202. The feedback module 202 analyses the monitored voltage/current data to determine the power or dimming level at the load 12.

The analysis may be done in various ways. For example, the feedback module 12 may compare the monitored voltage/current data with reference phase cut signal data (or reference data). The reference data may be in the form of a look up table for various dimming power levels, or reference waveforms, or voltage/current levels thresholds. The reference data may be initially preset and then dynamically updated when the ELS 100 is activated. In this regard, the Feedback Processing Module will analyze the full power provided to the load 12 at start up. If the reference "full power" data as compared to the monitored voltage/current data has not changed then the stored reference data may be used to provide the appropriate dimming to the load 12. If the reference "full power" phase cut signal data as compared to the monitored voltage/current data has changed then the stored reference data may be dynamically updated to take into account any changes in the ELS 100 configuration and/or load 12 requirements. Based upon the reference "full power" data, the power to the load 12 can be reduced to an appropriate dimming level (e.g., 50%, 20%, etc. of the reference "full power").

The detection module 14 may continue to monitor the load 12 voltage/current data to allow for further adjustments as needed while the emergency condition exists. For example, the emergency lighting requirements may change as the emergency condition continues or greater dimming may be set to prolong the life of the emergency power source 10. Such dynamic changes be pre-set or programmed based upon time duration of the emergency condition, power level/runtime remaining of the emergency power source 10 or temperature of the emergency power source 10.

The feedback processing module 12 provides the results of the analysis to a controller 203. The controller 203 generates an adaptive data structure used to create a control signal to adjust/create the sine wave output with phase cut waveform. A PWM signal module 205 may be used to create PWM signals that control/adjust the sine wave output with phase cut waveform generators (as shown, e.g., in FIGS. 4 and 5).

A memory 204 may be used to store data and the reference data as may be needed.

In other embodiments, the phase-cut waveform generator is configured with a preset dimming power level to provide to the load 12. In this embodiment, there is no need for a user to control or set the preset dimming power level.

Figure 11:
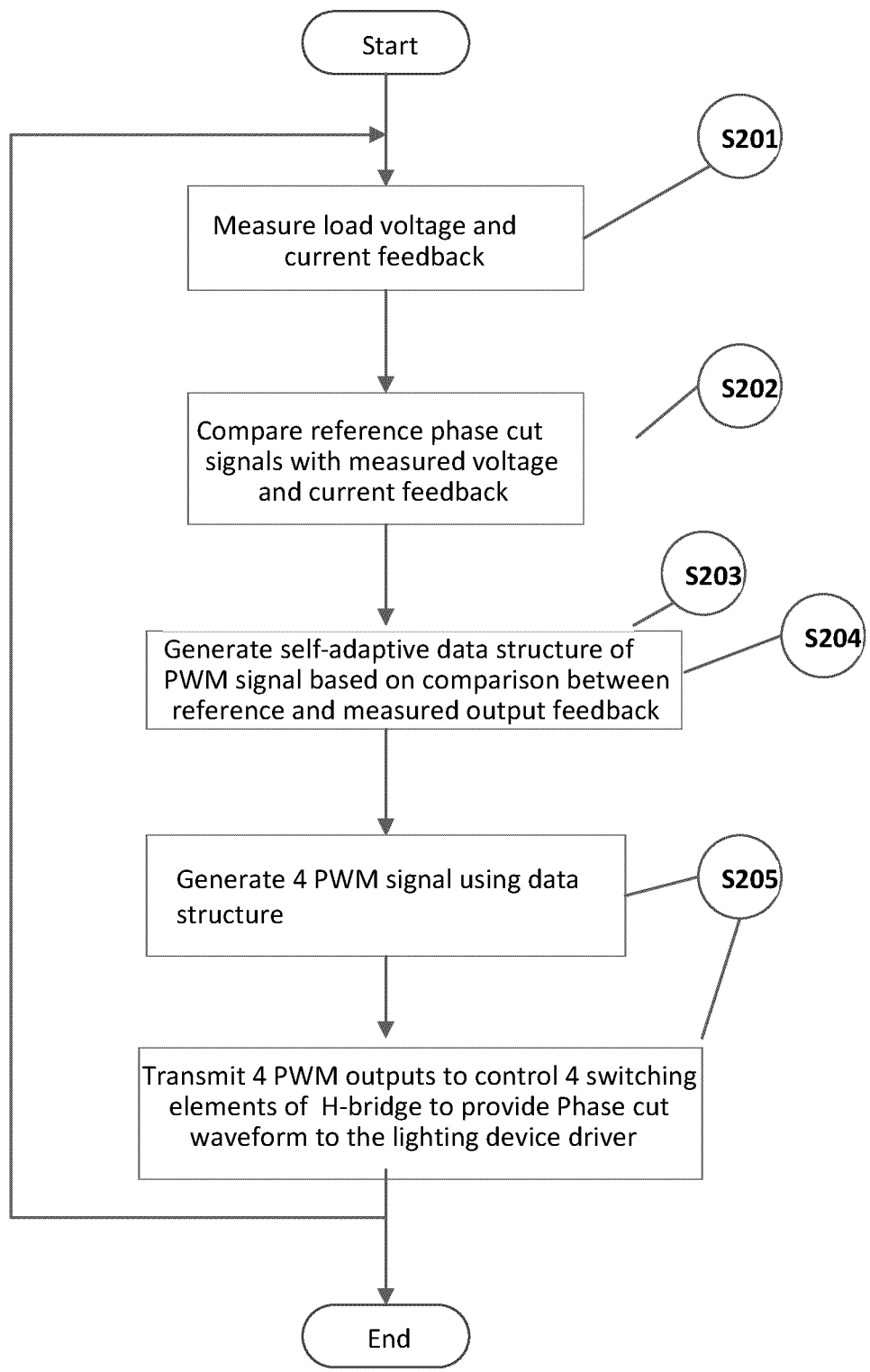
FIG. 11 is a flowchart of a dimming method according to another yet embodiment of the present invention.

It should be understood that the various elements/blocks shown in FIG. 10 may be combined or modified to provide the functionality and structures described above. In addition, a combination of hardware and software may be used for implementation. In this regard, FIG. 11 shows a flow chart of an algorithm that may be used to implement the dimming controller structure shown in FIG. 10. The numbered steps shown in FIG. 11 correspond to the numbers structural elements shown in FIG. 10.

In addition, the dimmer controller 200 may include an interface 15 to monitor/control/adjust the dimming of the load 12 as needed. The interface 15 may be a simple manual switch such a rotary dial or dip switch that is used to manually adjust the dimming as needed. In other embodiments, the interface 15 may be a data port to allow for interface to monitoring equipment. The interface 15 may also be a wireless connection to a remote-control center. The wireless connection may be, for example, WiFi, wireless mesh, or NFC, etc.

The advantages of various illustrated embodiments over existing systems are therefore evident in that the system embodying the various illustrated embodiments will operate at or above minimally required illumination during a loss of AC power and achieve longer period of backup power during emergency. The emergency backup system, in the illustrated embodiment, combines dimming capability different types of emergency lighting systems. The device can also be used in combination with present full power output UPS/IPS emergency backups as well as with present inverter emergency backup systems, or can be a dedicated emergency backup device for use with LED loads installed in single lighting fixtures with and without AC LED drivers.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

In the claims references in parentheses refer to reference signs in drawings of exemplifying embodiments or to formulas of embodiments, thus increasing the intelligibility of the claim. These references shall not be construed as limiting the claim.

The invention claimed is:

1. An emergency power system, comprising:
    a power source,
    a phase-cut waveform generator including a wave generator coupled to the output of the power source and arranged to provide a phase-cut waveform to a load, by modulating an on-time step function to a sinusoidal pulse width modulation signal and filtering to generate the phase-cut waveform;
    a detection module arranged to monitor voltage and/or current data supplied to the load by the phase-cut waveform generator; and
    a controller arranged to control the phase-cut waveform generator to adjust a power level of the load by modifying the phase-cut waveform based upon the monitored voltage and/or current data and reference data.

2. The emergency power system of claim 1, wherein the phase-cut waveform generator generates the phase-cut waveform from a sine, rectangular and/or triangular wave.

3. The emergency power system of claim 1, wherein the reference data is in the form of a look up table for various dimming power levels, or reference waveforms for various dimming power levels, or voltage/current levels thresholds for various dimming power levels.

4. The emergency power system of claim 1, wherein the controller generates a PWM control signal to control the phase-cut waveform generator.

5. The emergency power system of claim 1, wherein the detection module include a voltage and/or current sensor.

6. The emergency power system of claim 1, wherein the controller upon initiation of the emergency power system makes a determination to dynamically update the reference data based upon the monitored voltage and/or current data at full power to the load.

7. The emergency power system of claim 5, wherein the controller generates a PWM control signal to adjust the phase-cut waveform generator based upon one or more present conditions that occur while the emergency power system is activated.

8. The emergency power system of claim 7, wherein the one or more present conditions include an amount of time the emergency power system (100) has been activated and/or a remaining runtime of the power source and/or temperature of the power source.

9. The emergency power system of claim 1 further comprising an interface to allow a user to control/adjust the power level of the load.

10. A method for dimming an emergency lighting device comprising the steps of:
    measuring a load voltage and current of the emergency lighting device;
    comparing reference dimming data with the measured load voltage and current;
    determining a dimming control signal based upon the comparison;

generating a phase-cut waveform based upon the dimming control signal to reduce the load voltage and current of the emergency lighting device, wherein the phase-cut waveform is generated from a sinusoidal pulse width modulation signal, by modulating an on-time step function to a PWM signal and filtering to generate the phase-cut waveform.

* * * * *